United States Patent [19]

Sheldon

[11] 4,068,404
[45] Jan. 17, 1978

[54] SHADE-PRODUCING STRUCTURE AND METHOD

[76] Inventor: Robert T. Sheldon, P.O. Box 486, DeLeon Springs, Fla. 32028

[21] Appl. No.: 641,622

[22] Filed: Dec. 17, 1975

[51] Int. Cl.² .......................................... A01G 13/02
[52] U.S. Cl. ...................................... 47/26; 47/28 R; 52/83; 135/1 R; 135/3 R; 135/15 CF; 135/DIG. 8
[58] Field of Search ............. 47/26, 28 R, 29, 17, 47/20; 135/1 R, 3 R, 15 R, 15 CF, 15 PE, 15 PQ, DIG. 5, DIG. 8; 52/4, 23, 63, 83, 222; 254/83, 50.1; 294/28, 118

[56] References Cited

U.S. PATENT DOCUMENTS

| 711,225 | 10/1902 | Putnam et al. | 47/26 |
|---|---|---|---|
| 727,541 | 5/1903 | Hayes | 47/26 |
| 751,713 | 2/1904 | Berry et al. | 47/28 |
| 982,354 | 1/1911 | Easton | 294/28 |
| 1,106,624 | 8/1914 | Cadwallader et al. | 135/DIG. 8 |
| 1,187,210 | 6/1916 | Warner | 52/4 |
| 1,469,204 | 9/1923 | Smith | 254/83 |
| 2,051,643 | 8/1936 | Morrison | 47/28 |
| 2,251,624 | 8/1941 | Foree et al. | 47/28 |
| 2,454,464 | 11/1948 | Lee | 135/15 CF |
| 2,491,327 | 12/1949 | Morse | 254/50.1 |
| 2,562,005 | 7/1951 | Wenzel et al. | 135/15 CF |
| 2,974,442 | 3/1961 | Womelsdorf | 47/26 |
| 3,140,563 | 7/1964 | Allen | 47/20 |
| 3,197,919 | 8/1965 | Pasztor | 47/46 |
| 3,211,426 | 10/1965 | Handley | 254/83 |
| 3,336,704 | 8/1967 | Clay | 52/23 |
| 3,381,424 | 5/1968 | Butler | 47/26 X |
| 3,398,491 | 8/1968 | Babcock | 52/222 X |
| 3,564,784 | 2/1971 | Mollinger | 52/63 |
| 3,638,368 | 2/1972 | Pierson | 47/28 UX |
| 3,653,150 | 4/1972 | Howard | 47/29 |
| 3,932,958 | 1/1976 | Kistler, Jr. et al. | 47/26 |

FOREIGN PATENT DOCUMENTS

| 652,389 | 11/1962 | Canada | 47/29 |
|---|---|---|---|
| 738,147 | 7/1966 | Canada | 52/63 |
| 302,736 | 12/1917 | Germany | 135/DIG. 8 |
| 1,918,300 | 10/1969 | Germany | 47/29 |
| 2,205,770 | 8/1973 | Germany | 47/17 UX |
| 291,382 | 4/1963 | Netherlands | 135/1 R |
| 1,075,431 | 7/1967 | United Kingdom | 47/29 |

OTHER PUBLICATIONS

"Plastic Materials for Covering Greenhouses", Speights et al., Texas Agricultural Progress, vol. 8, July–Aug. 1962, No. 4.

Primary Examiner—Edgar S. Burr
Assistant Examiner—Steven A. Bratlie
Attorney, Agent, or Firm—Morgan, Finnegan, Pine, Foley & Lee

[57] ABSTRACT

A wind-damage-resistant structure for producing shade comprises a perimeter of spaced uprights surrounding a tract of land; interior uprights within the perimeter; a lower network of supporting cables fastened to the land outside of the perimeter and supported by the uprights, a shade-producing fabric cover fixed at its edges to the upper parts of the perimeter uprights and supported by the lower network of cables, an upper network of restraining cables also fastened to the land outside of the perimeter and supported by the uprights, the lower network and the cover, and holddown cables at intervals within the structure, fastened at their lower end to the land and passing upwardly through the lower network, the cover and attached to the upper network so as to restrain wind-induced upward motion of the cover.

20 Claims, 14 Drawing Figures

SHADE-PRODUCING STRUCTURE AND METHOD

This invention relates to a structure for producing shade and to a method for constructing such structure. More particularly, it is concerned with a wind-damage-resistant fabric covered shelter suitable for covering large tracts of land, e.g., to protect plants growing thereon from damage by excessive sunlight, extremes of temperature, rain and the like.

BACKGROUND OF THE INVENTION

Growing plant life, such as food crops, tobacco, decorative flowers, ferns and the like can be damaged by exposure to excessive amounts of sunlight, extremes of temperature, rain, strong wind and other natural hazards. With ferns, especially, it is a universal practice to grow the plants under shelters, because strong sunlight will turn the leaves from a desirable green to an undesirable yellow in a matter of just a few days. While the present invention is to be described with particular reference to protecting growing ferns from exposure to excess sunlight, it is to be understood that it protects and benefits plant life in general from exposure to all of the hazards broadly mentioned above. Moreover, the invention is useful wherever shade structures are desirable, such as animal protecting covers, recreation area covers, swimming pool covers, patio covers, marina covers, automobile covers, industrial storage area covers, and the like.

The growing of ferns for commercial purposes was begun in certain areas of the southern United States where natural shade was available under tall, lacy branched and lightly-leaved trees. This produced the desired dappled sunlight effect, but the practice had two major disadvantages: (i) the increasing demand for fern-foliage soon used up the land available under the trees, and (ii) the use of fertilizers on the ferns also stimulated the trees to produce heavier leafing, which increased the shade density to the point where fern growth was retarded. The practice then became established of constructing wooden post and beam structures, covered with chicken wire and overlaid with rosemary bushes. These structures, while still in use, were expensive to construct because the wooden posts and beams required 10 × 12 foot centers for strength, the rosemary bushes were relatively heavy and much labor was required to maintain them. More recently, shade-producing fabric, and especially shade-producing plastic fabric strips have become available and the shade producing structures are being modified to the extent that the chicken wire and rosemary bush construction is being supplemented by a combination of wires stapled into a network on the upright posts and then the plastic fabric is fastened to each wire. These constructions, however, are all based on prior practices, and suffer many disadvantages in common. For example, the 10 × 12 foot centers on the uprights require 378 expensive posts per acre, the wires flex and break, the wires cut the fabric, and, because of the relatively close spacing of the uprights, labor saving tractors cannot go down the rows of plants to apply fertilizers, herbicides, and the like.

In all cases, a most serious problem with such prior art structures for protecting plants is their susceptibility to damage by wind. This is very expensive for three reasons: (i) the labor to reconstruct the structure is great, (ii) the cost of replacing the materials is considerable (plastic cloth at the present time costs about $3000 per acre); and (iii) the exposure of tender plants to the hot sun for more than a short time can cause irreversible damage to them.

Many proposals have been advanced for constructing shade producing structures capable of covering large tracts of land while still retaining a degree of resistance to destruction by wind. All of the prior art structures, however, have one or more serious shortcomings. In Hayes, U.S. Pat. No. 727,541, a structure is shown in which transverse wires are supported on posts and strips of the shade-producing fabric are woven longitudinally through the wires. The primary shortcomings in such a design reside in the lack of a means to prevent the cover from billowing, the fact that the cloth cannot be removed fast to avoid damage if a hurricane should come through; and the alternating arrangement of wires, top and bottom of the cloth, can cause the uprights to loosen and lift out of the ground. Womelsdorf, U.S. Pat. No. 2,974,442, shows shade cloth pinned to support wires. Since the wires are fastened to the uprights, the wind will tend to blow the posts out of the ground, as the shade cloth billows; and each pin would have to be pulled to unfasten the cloth for safe-keeping in the event of an approaching storm. Allen, U.S. Pat. No. 3,140,563, discloses a large cover on posts and cables, which can be retracted in the event of an approaching storm. However, there is no means of tying down the cover to prevent excessive billowing and the retracting mechanisms are complex and subject to jamming. Putnam, et al., U.S. Pat. No. 711,225, discloses a post and beam construction with longitudinal wire supports for covers which roll like window shades into aboveground containers. This structure has no means for holding down excessive billowing, and the structure cannot be dissembled quickly in the event of an approaching storm.

A new structure has now been developed which overcomes all of the above-mentioned disadvantages in a novel way. An essential holddown feature keeps the cover fixed to the ground when the wind blows, but still enables the cover to be easily and quickly removed when high force winds, such as hurricane strength storms, are expected. After the storm has abated, the shade-producing cover can be readily and quickly replaced, before the plant life is destroyed or damaged by exposure to the sun, and the like.

BRIEF DESCRIPTION OF THE DRAWINGS

The invention may be better understood by reference to the drawings in which.

SUMMARY OF THE INVENTION

According to this invention there is provided a wind-damage-resistant structure for producing shade comprising a perimeter of spaced uprights surrounding a tract of land, at least one interior upright within the perimeter, a lower network of supporting cables fastened to the land outside of the perimeter and supported by the uprights, a shade-producing fabric cover fixed at its edges to the upper parts of the perimeter uprights and supported by the lower network of cables, an upper network of restraining cables also fastened to the land outside of the perimeter and supported by the uprights, the lower network and the cover, and at least one holddown cable within the structure, fastened at its lower end to the land and passing upwardly through the lower network, the cover and attached to the upper network so as to restrain wind-induced upward motion of the cover.

The invention also provides a method for constructing such a structure which includes erecting a perimeter of uprights and interior uprights, providing an anchored lower network of cables, drawing the shade-producing fabric across the lower network and fastening the cover under tension to the perimeter, providing an upper network of anchored cables and affixing holddown cables to the ground and then to the upper network. Upon the approach of a storm, the cover is removed for safe-keeping according to an aspect of this invention by releasing the upper network of restraining cables, permitting the holddown cables to drop away, then unfastening and pulling off the cover.

Also provided by this invention are tools and methods for tensioning the cover during installation, and for fastening adjacent strips of shade-producing fabric into a unitary cover during construction and repair.

DESCRIPTION OF THE PREFERRED EMBODIMENTS

Figure 1:
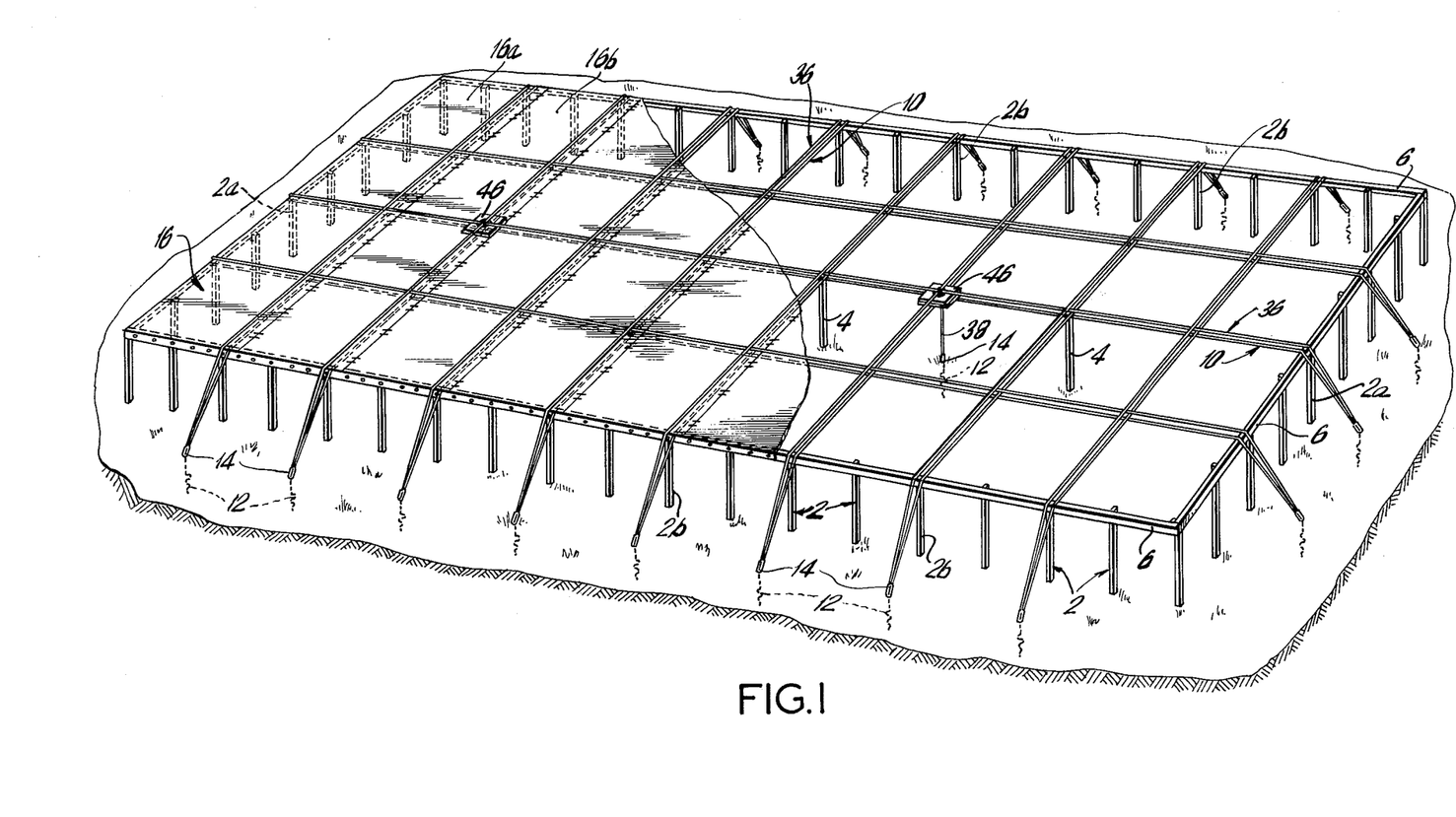
FIG. 1 illustrates in perspective partially in section of one form of an arrangement of uprights and the network of cables, cover and holddowns of a structure in accordance with this invention.

With reference now to FIG. 1, there is shown in exemplary form a preferred embodiment of the shade producing structure of the invention.

THE PERIMETER UPRIGHTS AND CAP STRIPS

The structure is erected on a tract of land, which may be of any desired shape by providing a perimeter of spaced uprights 2, which may be of any suitable material, such as wood, metal or preferably reinforced concrete, and of sufficient length to permit burying the lower ends in the ground and still have sufficient length extending above to provide clearance for plant life, and perferably enough clearance to permit walking about and even driving a tractor within the completed structure. By way of illustration, uprights 2 can be of 3 inches × 4 inches or similar dimensions by 10 feet in length. If these are set about 18 inches into firm ground they can provide about 8 foot 6 inch clearance for the shade fabric, which is suitable for most purposes. The spacing of the uprights in the perimeters can be as desired, but conveniently they will be located on about 10 foot centers. This will permit the erection of structures on large tracts of land while still providing a measure of flexibility to accommodate irregular perimeters.

Figures 2, 3:
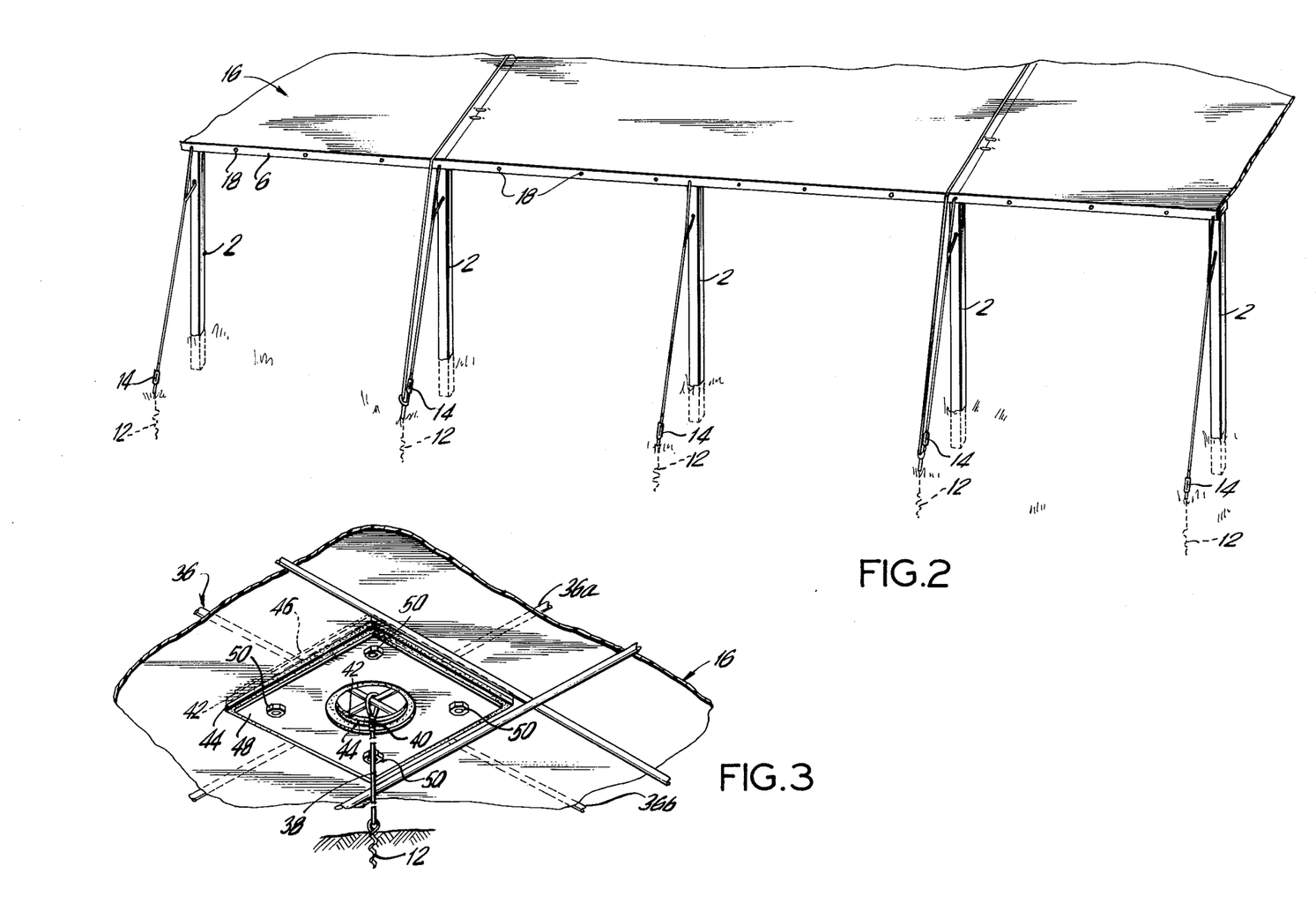
FIG. 2 is a side elevation view, partially in perspective of a completed structure according to this invention.
FIG. 3 is a perspective view of a reinforced aperture in the cover of a structure according to this invention and illustrates a preferred way of restraining the cover.
Figure 5:
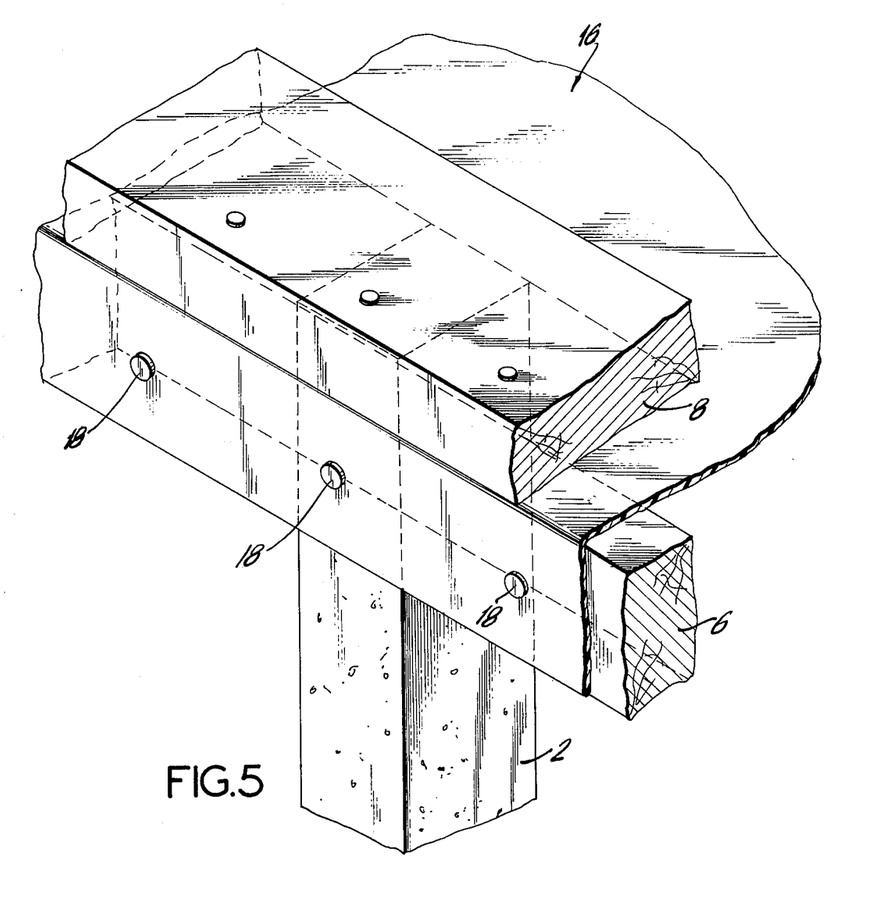
FIG. 5 is a perspective view of an upper portion of a perimeter upright, a cap strip and a portion of the shade-producing fabric as assembled in a structure according to this invention.

Horizontal cap strips 6 are fastened to the upper ends of perimeter uprights 2. These cap strips help maintain the uprights in a vertical position and support the cable networks, but their primary purpose is to provide a means for securing the shade-producing cover under tension. Conveniently, cap strips 6 will be formed of lumber of suitable rigidity, to facilitate fastening of the fabric, e.g., as with nails. The means of attachment of cap strips 6 to uprights 2 can vary widely, but, as is shown in FIGS. 2 and 5, 2 × 4 inch strips of rough cut cypress or the like can be fastened to the top of perimeter uprights 2, e.g., by using bolts and, if desired, an additional strip of lumber (8, FIG. 5) can be used on top of the fabric to provide further restraint to the fabric which is attached to cap strip 6.

THE INTERIOR UPRIGHTS

Located within the perimeter of uprights 2 are at least one interior upright 4 and preferably a plurality thereof. It is a very substantial advantage of this invention that the number of interior uprights 4 can be much less than those expected to be necessary from the prior art designs. As mentioned above, the 10 foot × 12 foot spacing commonly used in prior art fern shade structures requires about 378 uprights, perimeter and interior, per acre. In the present structure, only 47 uprights will suffice for an acre. Moreover, because fewer interior uprights 4 are necessary, wider spacing between them is possible and this permits tractors to move up and down the rows of plant life, something which cannot be done with the prior art structures. Interior uprights 4 can be of the same or different construction as perimeter uprights 2. They are arranged to form longitudinal rows 2a-4-2a with the corresponding uprights 2a in the perimeter, and to form transverse rows 2b-4-2b with the corresponding uprights in the perimeter. Obviously, if at least one interior upright is used, there will be four corresponding perimeter uprights, two each or 2a and 2b. However, for maximum strength and flexibility in conforming to irregular shapes, at least one non-corresponding perimeter upright will also be spaced on either side of the corresponding uprights, and in preferred rectangular structures according to this invention, therefore, there will be at least 12 spaced uprights in the perimeter for each interior upright.

THE LOWER NETWORK OF SUPPORTING CABLES

Figure 4:
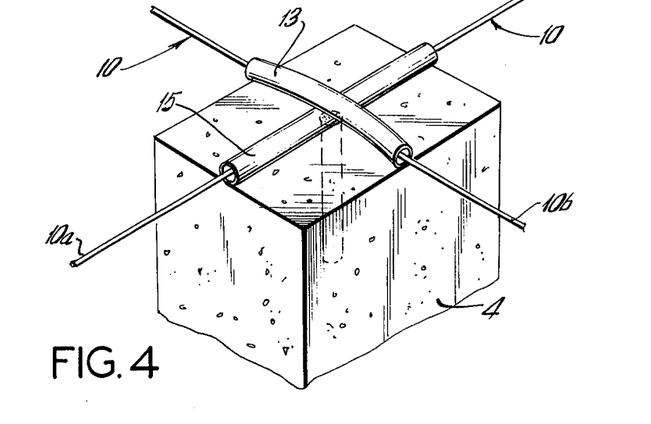
FIG. 4 is a perspective view of an upper portion of a typical interior post as used in a structure according to this invention.

A lower network 10 of supporting cables is next provided by arranging parallel runs across cap strips 6, and anchoring the free ends to the land outside of the perimeter. The term "cable" as used herein is intended to include both single wire and multi wire constructions, but because single wires have a "memory" and tend to break on repeated flexing, multiwire cables are preferred. The latter also can be highly tensioned without breaking as often as single wires, too. Although many different sizes and types of cable can be selected and used, it is convenient to employ galvanized marine-type cable sized ⅜ inch 1 × 19 or plastic processed cable (such as the plastic impregnated type known as SPACE-LAY, and available commercially from a number of sources.) These are preferred because they are weather-resistant, capable of extending over multi-acre tracts of land and yet they can be anchored and tensioned into 20 inch grids with more than adequate properties for the purpose herein. Details of anchoring the cable can vary considerably, although it has been found convenient to use earth augar screw type anchors, typically like those employed for fastening mobile homes to the earth. Such anchors 12 are illustrated diagramatically in FIG. 2. Also shown in FIG. 2 are one preferred means for tensioning the individual cables in the network, consisting of turnbuckles 14. These will be sized to the cable, e.g., if a ⅜ inch cable is used, a ¼ inch or ⅜ inch turnbuckle will be selected. The lower network 10 of individual cables preferably will be rectangular and will correspond at least to the longitudinal and transverse rows of uprights discussed above. For maximum convenience however, the lower network will also include intermediate cables equally spaced on either side of the row-corresponding cables, as is shown in FIG. 1. A convenient spacing for lower network 10, if a large field is to be sheltered, is to use a 20 foot rectangular grid, with 10 foot spacing on the perimeter uprights and 40 foot spacing on the interior uprights. Preferably, the cables are sheathed with a fabric-protecting overlayer, such as a plastic or rubber sleeve, or they are impregnated with plastic by the manufacturer, so as to minimize wear-induced fabric failure. The lower network is supported by cap strips 6 which in turn rest on uprights 2, and also by interior uprights 4. The network can merely rest on the interior uprights, but preferably an individual or pair of individual cables in network 10 will be fastened, and, especially preferably, slidably fastened to the upper portion of uprights 4. One typical means for slidably fastening network 10 to upright 4 is shown in FIG. 4, where a pair of conduits 13 and 15 are fastened, e.g., by welding, to a rod or bolt buried in upright 4. If the conduits are ⅜ inch or ¾ inch in inside diameter and a few inches in length, ⅜ inch cables 10a and 10b of lower network 10 can pass therethrough, yet be fixed to restrain motion in an upward-downward direction. Of course, other means of attaching the cables also can be used, such as providing staples, or wire loops, and the like, in place of conduits 13 and 15.

THE COVER

A flexible, relatively non-elastic cover 16 is stretched over lower network 10 and fastened under tension to the perimeter, e.g., by affixing to cap strip 6, then installing, if desired, optional board 8 (FIG. 5). Large headed nails 18, e.g., of the Simplex type, can be used for this purpose. Although any conventional shade cloth material can be used, it is preferred to use a plastic material, to resist rotting and to withstand the tensioning needed to minimize billowing. Preferred for this purpose is a polypropylene plastic shade cloth. Moreover, although the cover can be of one piece construction, it is preferred to install it in the form of a plurality of strips (16a, 16b, etc. FIG. 1) and then to join the strips at their adjacent edges to produce a single wide strip. Means for fastening the adjacent edges can vary widely, but it is convenient to employ nails which are about 4 inches long and merely to insert them at frequent intervals along the edges, much in the same way that common straight pins are used to join lighter fabrics.

Figure 6:
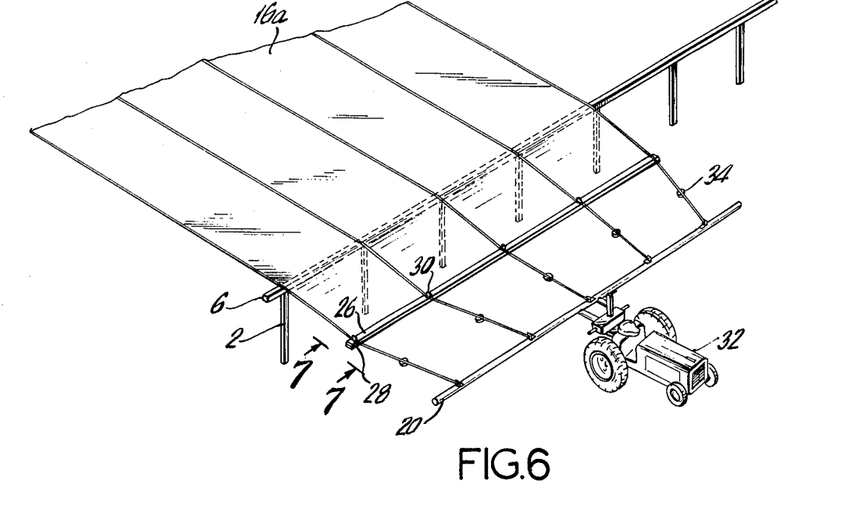
FIG. 6 illustrates a preferred means for tensioning the shade fabric in producing a structure according to this invention.
Figure 7:
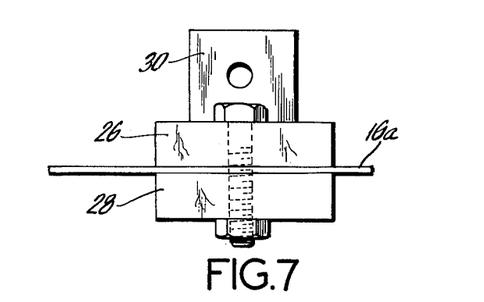
FIG. 7 is an end view along the line 7—7 in FIG. 6, showing on form of means for attaching the shade fabric to the tensioning tool of this invention.
Figure 8:
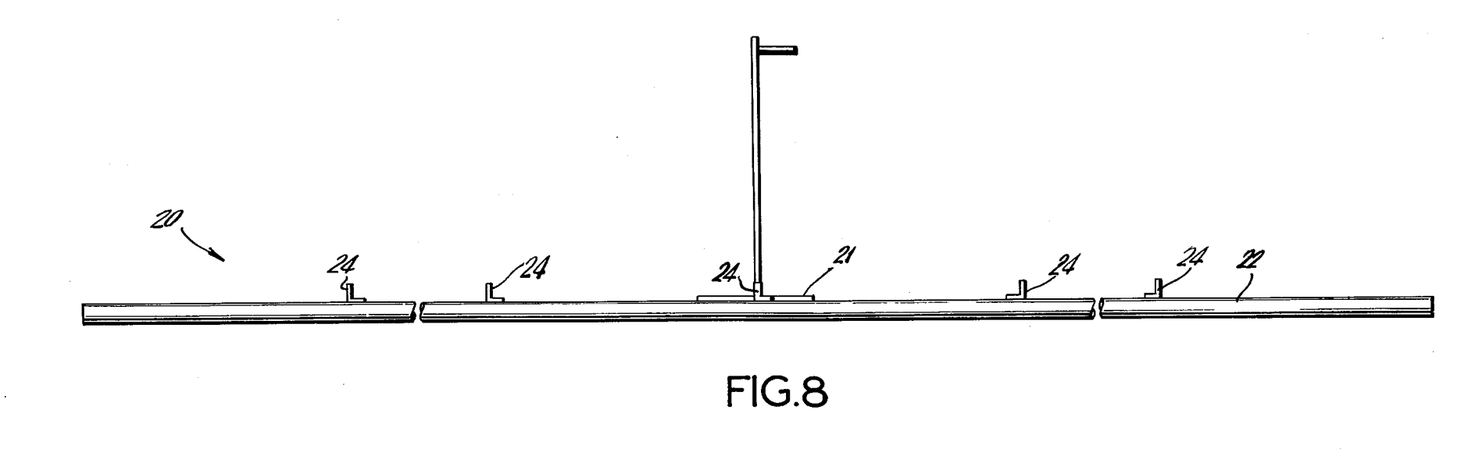
FIG. 8 is a back elevation view of a fabric tensioning tool according to this invention.
Figure 9:
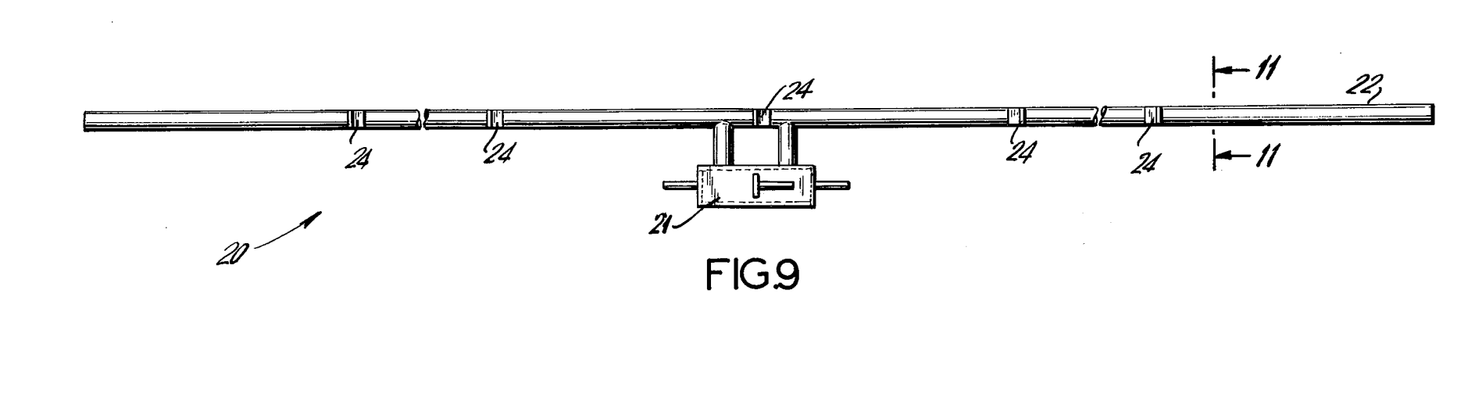
FIG. 9 is a top view of the tensioning tool shown in FIG. 8.
Figure 10:
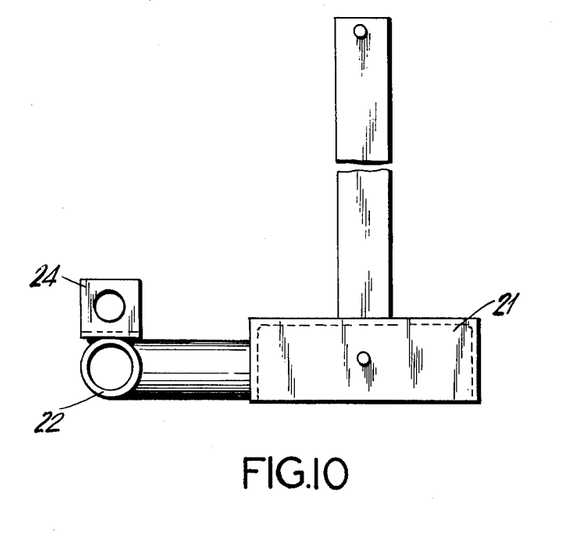
FIG. 10 is an end view of the tensioning tool in FIG. 8.
Figure 11:
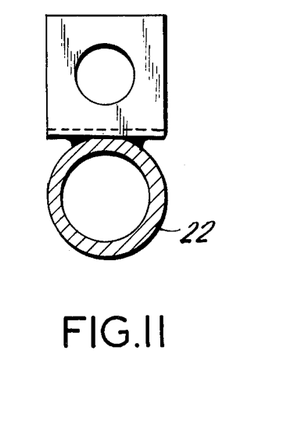
FIG. 11 is a cross sectional view of the tensioning tool of FIG. 9 along the line 11—11.

It is a preferred feature of this invention to provide a tool and a means for tensioning the shade-producing fabric during construction. Referring to FIG. 6, a strip of fabric, 24 inches wide is fastened at one end to the opposite cap strip (not shown) or to an intermediate transverse cable in lower network 10. Then the free end is fastened to a cloth tensioning tool comprising a vehicle drawbar 20 including a three point vehicle hitch 21. Drawbar 20 is shown in greater detail in FIG. 8 and consists of pipe 22 at least as long as the width of the fabric strip 16a, and including fastening tabs 24 at intervals (which preferably correspond in spacing to seams in the fabric). FIGS. 9-11 show other details of construction of the drawbar tensioning tool. The tabs 24 serve as points of attachment to the cloth. Referring to FIG. 7, the free end of the fabric is pierced and fastened between boards 26 and 28, e.g., 1 inch × 4 boards, with nuts and bolts or the like, board 26 including a plurality of tabs 30, corresponding to tabs 24 on drawbar 20. This spreads the force exerted over a wide area of the fabric, when the tensioning tool has been attached to tractor 32 and tabs 24 have been joined to corresponding tabs 30 through tension inducing means, such as turnbuckles, ratchets or comealongs 34, and the vehicle is moved away from the perimeter, pulling fabric strip 16 into position. Then the tensioning means 34 are adjusted until the fabric strip 16a has been pulled to the proper tightness and finally strip 16a is fastened to cap strip 6, e.g., by nailing at the top. Boards 26 and 28 are then disconnected and moved to the next strip of fabric and the process is repeated, fastening adjacent edges to produce a unitary cover, as described above.

THE UPPER NETWORK OF RESTRAINING CABLES

An upper network 36 of restraining cables is next provided by arranging parallel runs across cover 16 and anchoring the free ends outside of the perimeter, as described for the lower network. It is seen that upper network 36 passes over and is supported by horizontal cap strips 6, by cover 16, by lower network 10, and by each interior upright 4. The spacing of the cables in the upper network should conform substantially at least to that of the lower network, as is shown in FIG. 1. The purpose of the upper network is to restrain billowing of cover 16, while permitting at least some natural undulation. Means for constructing, anchoring and tensioning the upper network follow the disclosure above for the lower network. It is desirable, however, to provide a conventional quick-release fastener at one end of each cable in the upper network to facilitate release in the event of an approaching storm, as will be mentioned later.

THE INTERIOR HOLDDOWN CABLES

An essential feature of this invention is to provide at least one interior holddown cable 38, slidably engaged to a cable in the upper network so as to restrain wind-induced upward motion of the cover. As is shown in FIG. 3 (not to scale), holddown cable 38, which may be of the same material used in network 10 and 36 is anchored at its lower end in the ground, e.g., with anchor 12. The cable 38 goes upwardly through the lower network (not shown), through cover 16 and then engages at least one, and preferably two, cables 36a and 36b in upper network 36. Preferably, engagement is slidable, for ease in removing cables 36a and 36b in the event of an approaching storm, and an easy means to accomplish this is simply to form a loop in cable 38 and to fasten the free end, e.g., with a metal sleeve 40. In FIG. 3 is further illustrated a preferred means for passing holddown cable 38 through cover 16, and this comprises providing an aperture, e.g., a 3 inch hole, fitted with a rub resistant stiffener, which can comprise 6 inch × 6 inch felt paper plate 42 and 44 above and below the fabric, overlaid with corresponding metal plates 46 and 48 above and below the felt paper plates, and four bolt fasteners 50 to hold the assembly together. Depending on the size of the tract of land, at least one such holddown cable assembly will be used. It has been found in practice that only one such cable is necessary for each two interior uprights 4. Thus if the interior uprights are on 40 foot centers, the holddowns can be installed on 80 foot centers, preferably in the upright rows.

The importance of providing slidable engagement of holddown cable 38 with upper network 36 becomes apparent when the structure is to be temporarily uncovered to avoid damage by high intensity winds. In such event, one end of each cable of the upper network is released and then the cables are pulled to the general location of the still fastened ends. This releases the slidably engaged interior holddown cables 38 allowing them to drop to the land and thereby disengage the cover. Cover 16 can then be released from all but one portion of the perimeter and pulled toward the still fastened end and protected until the damages of destruction has ceased. Then, the procedure of assembly can be reversed.

Figure 12:
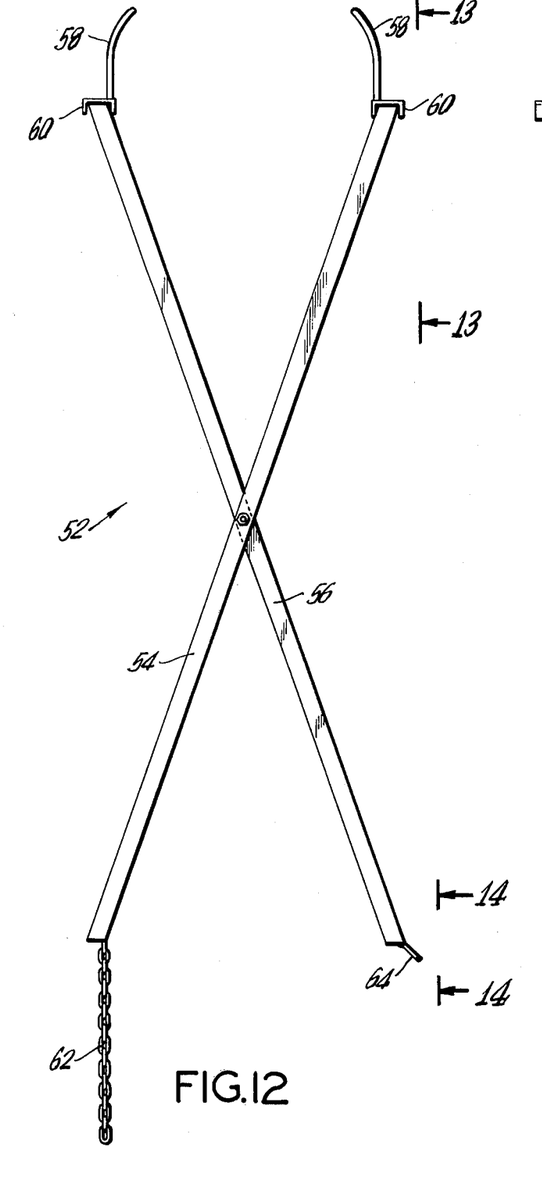
FIG. 12 illustrates a shade fabric stretching tool according to this invention.
Figure 13:
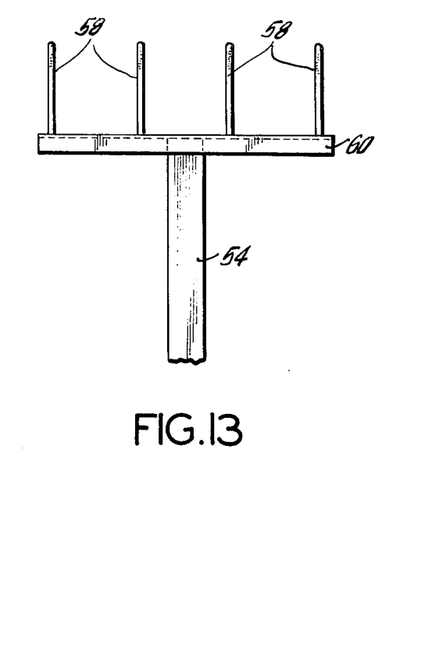
FIG. 13 is a view of a portion of the fabric grasping part of the tool shown in FIG. 12, taking along the line 13—13.
Figure 14:
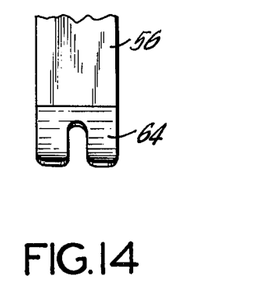
FIG. 14 is a view of a portion of a locking means in the lower part of the tool shown in FIG. 12, taken along the line 14—14.

In another preferred embodiment, the adjacent edges of strips 16a and 16b, etc. of fabric are fastened under tension, either during construction or to repair separations by providing a fabric stretching tool 52 (FIGS. 12-14) comprising two rigid handles 54 and 56, e.g., of steel 1 inch × 1 inch × 5 feet, arranged in an X-shape and pivoted at the point of intersection, e.g., with a ⅜ inch bolt and nut. The upper ends of each of handles 54 and 56 are provided with at least one and preferably a plurality of sharpened, fabric-engaging hooks 58, which can be fastened, e.g., to respective cross pieces 60, as is shown more clearly in FIG. 13. The lower ends of each of handles 54 and 56 are provided with adjustable, complementary locking means, such as link chain 62 and catch tab 64, the latter being shown more clearly in FIG. 14. The tool 52 is opened and each fabric engaging hook 58 is fixed to respective strips 16a, 16b, etc. of fabric opposite the location to be joined. Then the tool is closed and locked by moving the lower ends of handles 54 and 56 towards one another and fastening chain 62 into tab 64. This joins the fabric edges together enabling them to be pinned or otherwise fastened, under tension. Then tool 52 is disengaged.

Obviously an extremely advantageous structure has been provided according to the above disclosure. Following these teachings a large, ten acre tract has been covered with proven ability to withstand strong windstorms. The design permits the fabric to wave up and down when wind moves underneath, to dissipate the wind energy. The structure also is adapted to follow the contour of the land, and does so over a wide area. The structure can be raised quickly with a minimum of labor and can be taken down even more quickly in the event of an approaching storm. Wide interior upright spacing of up to 40 feet is readily possible to allow for mechanization to maintain the crops. In suitably large structures, interior roads can be provided every 120 feet, or the like to allow row crops to be sprayed using power sprayers and the like, for fungus or insects.

Obviously, many modifications will suggest themselves to those skilled in the art in view of the above detailed disclosure. For example, a network of sprinklers can provide water sprays throughout the interior. Interior braces can be used on the outside upright rows in the perimeter, in the direction the cloth is tensioned for increased strength, and the like. All such variations are within the full intended scope of the invention, which is defined by the appended claims.

I claim:

1. A shade producing structure comprising a shade cloth supported on uprights above a land area and including cables above the shade cloth to prevent excessive billowing thereof, a hold down restraint for said shade cloth comprising anchor means fastened to the land within the shade structure, a hold down cable attached at its lower end to the anchor means and passing upwardly through the shade cloth and means on the upper end of said hold down cable slidably engaged to at least one of said cables above said shade cloth.

2. A shade structure comprising:
   a perimeter of spaced uprights surrounding a tract of land, the upper portions of each upright being joined by horizontal elements;
   at least one interior upright within said perimeter spaced so as to form at least one longitudinal row and at least one transverse row of uprights with the corresponding uprights in the perimeter;
   a lower network of tensioned supporting cables fastened to the perimeter and supported by each interior upright;
   a cover comprising a shade producing relatively nonelastic fabric supported by said lower network of cables and fastened around its outer edge;
   an upper network of tensioned restraining cables fastened to the perimeter and passing over and being supported by the cover, and by said lower network; and
   at least one interior hold down cable within said perimeter, fastened at its lower end to the land and passing upwardly through said lower network of tensioned supporting cables, then through the cover and thereafter being slidably engaged to a cable in the upper network so as to restrain wind-induced upward motion of the cover.

3. A shade structure comprising:
   a perimeter of spaced uprights surrounding a tract of land, the upper portions of each upright being joined by horizontal cap strips;
   at least one interior upright within said perimeter spaced so as to form at least one longitudinal row and at least one transverse row of uprights with the corresponding uprights in the perimeter;
   a lower network of tensioned supporting cables fastened at each end to the land outside of the perimeter and supported by the horizontal cap strips and by each interior upright, the spacing of the cables in said network corresponding at least to said longitudinal and said transverse rows of uprights;

a cover comprising a shade producing relatively non-elastic fabric supported by said lower network of cables and fastened around its outer edge to the horizontal cap strips;

an upper network of tensioned restraining cables fastened at each end to the land outside of the perimeter and passing over and being supported by the horizontal cap strips, by said cover, by said lower network and by each interior upright, the spacing of the cables in said upper network corresponding at least to that of the lower network; and at least one interior hold down cable within said perimeter, fastened at its lower end to the land and passing upwardly through said lower network of tensioned supporting cables, then through the cover and thereafter being slidably engaged to a cable in the upper network so as to restrain wind-induced upward motion of the cover.

4. A shade structure as defined in claim 3 wherein the tract of land is substantially rectangular and each said network comprises a rectangular grid.

5. A shade structure as defined in claim 3 wherein each said upright comprises a reinforced concrete post.

6. A shade structure as defined in claim 3 wherein at least one cable of said lower network is slidably fastened to the upper portion of each said interior upright.

7. A shade structure as defined in claim 3 which includes a plurality of spaced interior uprights.

8. A shade structure as defined in claim 3 wherein there are at least 12 spaced uprights in said perimeter for each said interior upright.

9. A shade structure as defined in claim 3 wherein said cables are sheathed with a fabric protecting layer.

10. A shade structure as defined in claim 3 wherein said cables comprise a plurality of wires.

11. A shade structure as defined in claim 3 wherein said networks include a plurality of cables one part of which corresponds to the spacing of said longitudinal and said transverse rows of uprights and the remaining part of which is equally spaced therebetween.

12. A shade structure as defined in claim 3 wherein said cover comprises a plurality of strips of shade-producing fabric joined at their adjacent edges to produce a single wide strip.

13. A shade structure as defined in claim 12 wherein said cover comprises a flexible relatively non-elastic fabric.

14. A shade structure as defined in claim 12 wherein said cover comprises polypropylene.

15. A shade structure as defined in claim 3 wherein each said interior hold down cable passes through a corresponding reinforced aperture in said cover.

16. A shade structure as defined in claim 3 wherein at least said upper network includes a plurality of cables, one part of which corresponds to the spacing of said longitudinal and said transverse rows of uprights and the remaining part of which is equally spaced therebetween and each said interior hold down cable is slidably engaged to two cables in said remaining part of the network at a junction thereof.

17. A shade structure as defined in claim 3 wherein said cables are impregnated with a fabric protecting layer.

18. A shade structure for protecting plant life comprising:

a perimeter of spaced uprights surrounding a substantially rectangular piece of land, the upper portions of each upright being joined by horizontal cap strips;

a plurality of interior uprights within said perimeter spaced so as to form at least one longitudinal row and at least one transverse row of uprights with the corresponding uprights in the perimeter, and leaving at least one non-corresponding upright in the perimeter equally spaced between each said row of uprights;

a lower network of tensioned supporting cables fastened at each end to the land outside of the perimeter and supported by the horizontal cap strips, and comprising a plurality of cables, one part of which corresponds to the spacing of said longitudinal and said transverse rows of uprights and is slidably fastened to the upper portion of each said interior upright, and the remaining part of which is equally spaced therebetween and each cable in said remaining part passes over the cap strip above its junction with the upper end of each said non-corresponding upright;

a cover comprising a plurality of strips of shade producing relatively non-elastic fabric joined at their adjacent edges to produce a single wide strip supported by said lower network of cables and fastened under tension around its outer edge to the horizontal cap strips;

an upper network of tensioned restraining cables fastened at each end to the land outside of the perimeter and passing over and being supported by the horizontal cap strips, by said cover, by said lower network, and comprising a plurality of cables, one part of which corresponds to the spacing of said longitudinal and said transverse rows of uprights, and the remaining part of which is equally spaced therebetween and each cable in said remaining part passes over the cover and the cap strip above its junction with the upper end of each said non-corresponding upright; and a plurality of interior hold down cables within said perimeter, each fastened at its lower end to the land and passing upwardly through said lower network of tensioned supporting cables, through a reinforced aperture in the cover and thereafter being slidably engaged to a pair of cables in said remaining part of the upper network at a junction thereof so as to restrain wind-induced upward motion of the cover.

19. A method for constructing a shade structure comprising:

erecting a perimeter of spaced uprights around a tract of land and joining the upper portions of each with horizontal cap strips;

erecting at least one interior upright within said perimeter spaced so as to form at least one longitudinal row and at least one transverse row of uprights with the corresponding uprights in the perimeter;

producing a lower network of tensioned supporting cables by fastening one end of each cable to the land outside of the perimeter, passing each cable over the horizontal cap strips and over the upper portion of each interior upright and fastening the other end of each cable to the land outside of the perimeter;

forming a cover comprising a plurality of strips of shade producing relatively non-elastic fabric by fastening one end of each strip either to a horizontal cap strip or to an intermediate transverse cable in the lower network and drawing the other end across the lower network and fastening it under tension to the horizontal cap strip opposite the point of beginning, then repeating the step with each subsequent strip, abutting the adjacent edges to produce a single wide strip and thereafter fastening the adjacent edges to each other and the outer edges of each outermost strip to the underlying cap strips;

producing an upper network of tensioned restraining cables by fastening one end of each cable to the land outside of the perimeter, passing each cable over the horizontal cap strips, over the cover, and over the lower network and fastening the other end of each cable to the land outside of the perimeter; and erecting at least one interior hold down cable within said perimeter by fastening the lower end of said cable to the ground and passing it upwardly through said lower network of tensioned supporting cables, then through an aperture in the cover and thereafter slidably affixing the upper end to a cable at the upper end so as to restrain wind-induced upward motion of the cover.

20. A method for constructing a shade structure as defined in claim 19 which also includes the steps of temporarily uncovering said structure to avoid damage by high intensity winds by releasing one end of each cable in the upper network of tensioned restraining cables and pulling the free ends to the general locations of the opposite, still fastened ends, thereby releasing the slidably engaged interior hold down cables allowing them to drop to the land and disengage the cover; and releasing the cover from all but one portion of the perimeter and pulling the fabric to the still fastened end and protecting it from the wind until the danger of destruction has ceased.

* * * * *